(12) United States Patent
Reast

(10) Patent No.: US 6,361,026 B2
(45) Date of Patent: *Mar. 26, 2002

(54) VEHICLE SUSPENSION SYSTEM

(75) Inventor: John Bolland Reast, Bedford (GB)

(73) Assignee: Detroit Steel Products Co., Inc., Morristown, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,271

(22) Filed: Aug. 13, 1998

Related U.S. Application Data

(63) Continuation-in-part of application No. 08/716,451, filed as application No. PCT/GB95/00613 on Mar. 20, 1995, now abandoned.

(30) Foreign Application Priority Data

Mar. 31, 1994 (GB) .............................. 9406453

(51) Int. Cl.⁷ .............................................. B60G 11/02
(52) U.S. Cl. ...................................................... 267/47
(58) Field of Search ........................ 267/36.1, 47, 154, 267/158, 168, 260, 265, 269, 271

(56) References Cited

U.S. PATENT DOCUMENTS

| | | | | |
|---|---|---|---|---|
| 1,792,842 A | * | 2/1931 | Jansson | |
| 3,491,994 A | * | 1/1970 | Reynolds | 267/54 |
| 3,891,231 A | * | 6/1975 | Snoberger | 267/271 |
| 5,354,092 A | * | 10/1994 | Calvert | 267/271 |
| 5,566,928 A | * | 10/1996 | Lee | 267/271 |

FOREIGN PATENT DOCUMENTS

| | | | |
|---|---|---|---|
| DE | 583361 | * | 8/1933 |
| DE | 3329686 | * | 3/1985 |
| EP | 137096 | * | 3/1984 |
| EP | 0242548 | | 10/1987 |
| EP | 0752934 | | 7/2000 |
| FR | 2570031 | | 9/1984 |
| GB | 410282 | * | 5/1934 |
| GB | 937027 | * | 9/1963 |
| WO | 9011201 | * | 10/1990 |

\* cited by examiner

*Primary Examiner*—Christopher P. Schwartz
*Assistant Examiner*—C. T. Bartz
(74) *Attorney, Agent, or Firm*—Fildes & Outland, P.C.

(57) ABSTRACT

The present invention discloses a method and apparatus for a Vehicle Suspension System for a vehicle. The present invention comprises a left spring coupled to the chassis of a vehicle. The leaf spring couples to a rigid arm, which in turn couples to a pivotal axis that is located at a position offset from the neutral axis of the leaf spring. The position of the pivotal axis with respect to the neutral axis of the leaf spring varies the rate of leaf spring so as to soften or stiffen the suspension system.

46 Claims, 4 Drawing Sheets

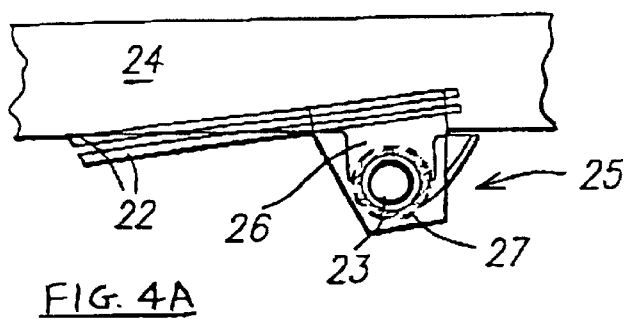
FIG. 4A
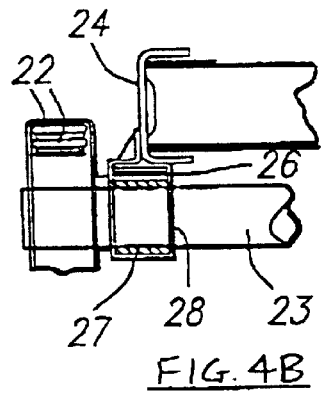
FIG. 4B
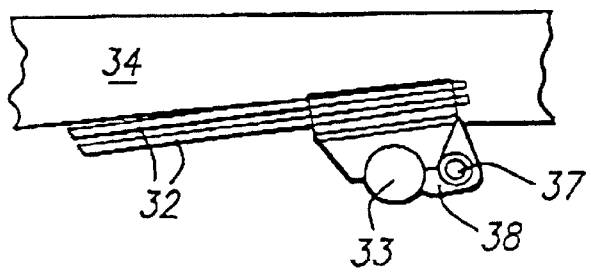
FIG. 5A
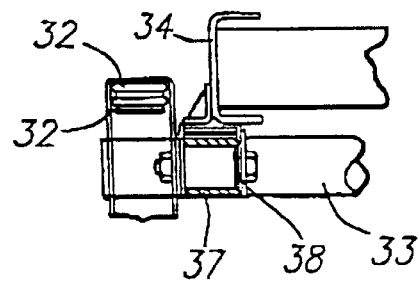
FIG. 5B
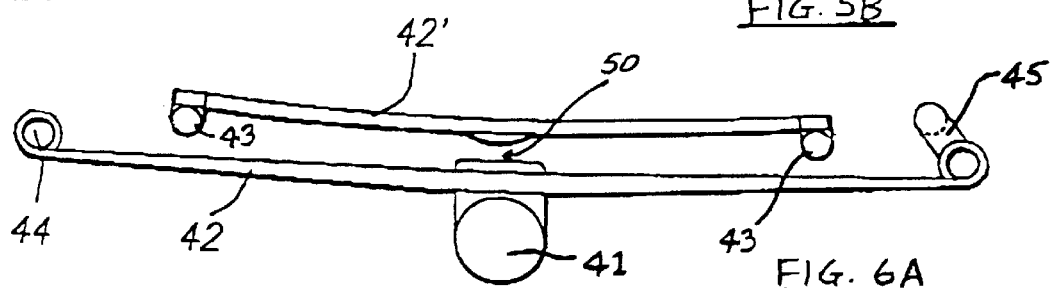
FIG. 6A
FIG. 6B
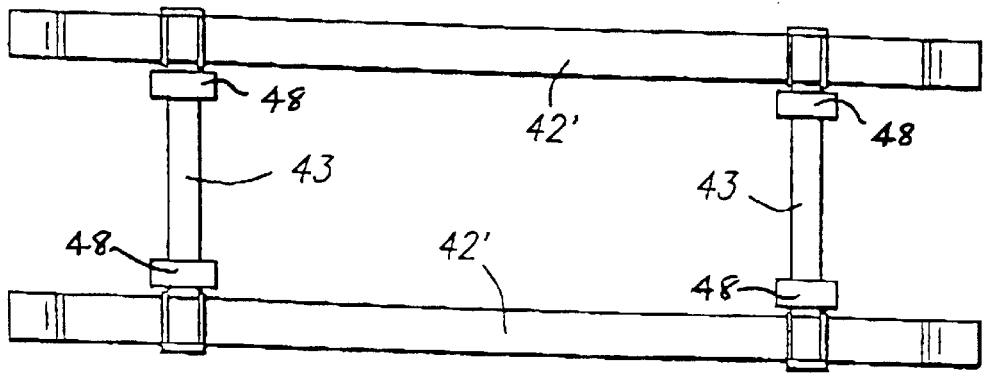

VEHICLE SUSPENSION SYSTEM

CROSS REFERENCE TO RELATED APPLICATION

This application is a CIP of prior application Ser. No. 08/716,451 filed Sep. 27, 1996 now abandoned which is a 371 of PCT/GB95/00613 filed Mar. 20, 1995.

This application claims the benefit of the earlier filed foreign/PCT application in the United Kingdom under Serial No. 9406453.2 on Mar. 31, 1994. Additionally, this application is a continuation application of PCT Application Ser. No. PCT/GB95/00613 filed on Mar. 20, 1995, as well as a continuation-in-part application of U.S. patent application Ser. No. 08/716,451 filed on Sep. 27, 1996, which is incorporated by reference for all purposes.

FIELD OF THE INVENTION

The present invention concerns a suspension system for a vehicle, in which a leaf spring is provided to suspend the main body or chassis of the vehicle from a Wheel-bearing axle of the vehicle.

Leaf springs are commonly used in vehicle suspension systems and act to deflect under load changes so as to isolate the main body from vibrations and irregularities occasioned in the course of the vehicle's travel over a surface. The leaf spring, in an unladen, or partly laden state, assumes a curved shape, the curvature of which increases or decreases under load changes, with concurrent changes in the length of the spring end points.

BACKGROUND AND PRIOR ART

It is normal practice to provide positive location at one end, usually the front end, of the spring, for example by means of a spring eye and a bush. This arrangement affords a substantially longitudinally fixed disposition for the vehicle's axle in relation to the main body. The other end, usually the rear end, of the spring is mounted in such a way as to accommodate changes in length of the spring and the shape of the spring at various load conditions is used dynamically to influence the steering and handling of the vehicle.

As an alternative to the use of rubber or polymer mountings, commonly known methods of mounting the relatively unfixed, for example, rear end of the spring, so as to accommodate length changes are a) by the provision of a shackle, or b) by the provision of a cam slider bracket.

In a known suspension system to be described hereinbelow the vehicle main body is suspended from a vehicle axle through a leaf spring having, at its front end, in the intended direction of normal travel of the vehicle, a spring eye and bush which affords a substantially longitudinally fixed disposition of the axle relative to the body. At its rear end, a pivotal shackle for accommodating changes of length of the spring as its curvature changes under varying load conditions, is used. In this known arrangement, forces produced by the angle of the shackle can affect the spring deflection rate in a non-uniform manner at various loads.

In another known suspension system also to be described hereinbelow the arrangement is similar to that described above but the shackle is replaced by a cam slider bracket in which an upper element has a lower surface of non-uniform curvature which bears upon an upper surface of the spring leaf in frictional contact therewith. As the spring leaf angle changes, in the locality of the cam slider bracket, the upper surface of the spring leaf bears upon differing zones of the lower curved surface of the upper element of the bracket, which alters the effective length of the spring leaf. This also changes the spring leaf deflection rate in a non-uniform manner at various loads and the friction between the lower curved surface of the upper element and the spring leaf has an adverse effect on the quality of the ride experienced on the main body of the vehicle. Further, measures to reduce or eliminate wear of the upper element be can made at additional expense in bracket design and manufacture. Even further, the effective length change of the spring leaf can also change the stress distribution along the spring leaf, thus deleteriously affecting its fatigue life. The shape of the lower curved surface of the upper element, and the ineffective length of the spring leaf beyond that element, use up considerable longitudinal installation space which reduces the effective length of the spring leaf available when the longitudinal installation space is limited, which is normally the situation. A modification of this known system includes a cam slider bracket also but at the front end of the spring leaf and a separate radius leaf affording positive longitudinal location for the axle.

In a further known suspension system disclosed in British Patent No. 937027 (Nilsson), the rate of a leaf spring is changed by using a torsion spring to connect at least one of the ends of the leaf spring pivotally to the vehicle frame or chassis, the torsion spring comprising a core element of polygonal cross-section surrounded by a sleeve element of corresponding cross-section Roller-shaped members of rubber or the like are provided between the core and sleeve elements and are deformed upon relative rotational movement therebetween. The leaf spring end is connected rigidly to one of the core and sleeve elements, so that it is tangential to a cylinder surface co-axial to the axis of the torsion spring. Thus, the torsion spring creates a torsional force (torque) as the core and sleeve elements rotate relatively to each other due to the leaf spring and change angle. This resultant torque acts on the leaf spring and, as a consequence, increases the spring rate to stiffen the leaf spring.

Nilsson states that the leaf spring could be preloaded to change the range of deflection of the spring and, also, that the length of the leaf spring could be selected to give the correct geometry capable of avoiding any horizontal deflection. This is a very inefficient way of using a spring rate modifier arrangement. If the spring length is not capable of avoiding a horizontal deflection, then Nilsson suggests that a shackle should be introduced into the system. Thus, the Nilsson suspension system uses torsion springs solely to increase the rates of the leaf springs by stiffening the springs at higher loads and is not capable of reducing the rates of the leaf springs by softening the springs at lower loads.

SUMMARY OF THE INVENTION

The invention aims to provide an improved suspension system with mounting for the spring which better accommodates changes in spring length. The inventive system combines the advantage of a low friction of the shackle arrangement but with the simplicity of a smaller number of components and with the ability to vary the deflection rate of the spring under different load conditions, whilst also increasing the load-carrying capacity of the spring at higher loads. All this being achieved with a saving of cost and weight.

The invention also aims to provide a further improved suspension system wherein the spring rate can be altered to create a notional horizontal deflection which is resisted to generate a corresponding horizontal linear force, as opposed to a torsional force (torque), which can act upon the spring to either reduce or increase its rate (softer or stiffer), as required. This softening or stiffening of the spring can take place at different parts of the total deflection of the spring within the same suspension system.

Accordingly, one aspect of the invention provides a suspension system for a vehicle, comprising a leaf spring adapted to suspend a main body or chassis of a vehicle from a wheel-bearing axle thereof a rigid arm having one end thereof connected rigidly to the leaf spring at or adjacent an end thereof, and an axis to which the other end of the radial arm is connected pivotally, which is located at a position substantially offset from the neutral axis of the leaf spring and which extends generally normal to the regular working plane of the leaf spring, wherein the position of the offset pivotal axis with respect to the neutral axis of the leaf spring is adapted to vary the rate of the leaf spring, to soften or stiffen the suspension system.

Preferably, the other end of the arm is pivoted substantially freely to the offset pivotal axis. That is to say, the arm is pivotable substantially freely about that axis. Such pivotal axis may be provided by a bush, as will be described hereinbelow, in which case, any resistance to pivotal movement of the arm about the axis would be negligible so that, within the working range of the suspension system, including softening and stiffening of the spring, the other end of the arm would still be pivoted to the axis in a substantially free manner with negligible torsional resistance if any.

Thus, the rate of the leaf spring can be varied or altered by selecting an arm length to create a notional horizontal deflection and by resisting that deflection, create a horizontal linear force, rather than torque, at the axis. This force acts along the arm and on to the spring in either direction, depending on the geometry of the system. By selecting the arm and axis positions it is possible to both soften and stiffen the effective rate of the spring as required, by effectively maintaining the spring in a different deflection position than would be the case if the spring were to be deflected in a freely installed state. This softening and stiffening can take place at different parts of the total deflection within the same system.

The offset pivotal axis may be adapted to take up any notional displacement, preferably a substantially linear notional displacement, thereof arising, in operation, from deflections of the leaf spring outside predefined spring loading and deflection ranges. Thus, the offset pivotal axis may be flexible for accommodating said take-up, preferably comprising a bush which may define internal voids therein for accommodating said take-up which, as mentioned above, can be substantially linear.

By this modification, there is introduced a controlled horizontal rate of deflection, rather than a solid resistance thereto, thereby providing for both control of the notional horizontal force and its effect upon leaf spring deflection, thus changing its rate and internal stress. By reducing initial horizontal forces to zero during initial deflections, using voids in, say, a bush and selecting the geometry of the system, a range of defections can be achieved, which have no effective horizontal forces, thus allowing the spring to deflect freely. Also, the voids allow for practical installation, by allowing for installation tolerances.

The position of the offset pivotal axis with respect to the neutral axis of the leaf spring in the rest condition of the system can be located such that, in operation, deflections of the leaf spring over predefined spring loading and deflection ranges produce negligible, if any, displacement of the offset pivotal axis from its rest position, in which case, the offset pivotal axis may be adapted to take up any notional displacement thereof arising, in operation, from deflection of the leaf spring outside said predefined spring loading and deflection ranges. Again, the offset pivotal axis may be flexible for accommodating said take-up, comprising, say, a bush defining, for example, internal voids therein.

In a preferred embodiment of the inventive suspension system, the position of the offset pivotal axis with respect to the neutral axis of the leaf spring and the pivotal connection of the other end of the arm to the axis are, in operation, adapted to provide operational forces resulting from deflections of the leaf spring outside defined spring loading and deflection ranges, which forces create, in a relatively lightly loaded state of the suspension system, a softening effect of the leaf spring and, in a relatively heavily loaded state of the suspension system, a stiffening effect of the leaf spring.

The leaf spring may be mounted to a transverse anti-roll device to which the vehicle body or chase is mounted, with the offset pivotal axis being in concentric relationship to the anti-roll device. In one embodiment, the leaf spring is mounted to the traverse anti-roll device by means of a first bracket, with the mounting of the vehicle body or chassis to the anti-roll device by means of a second bracket which has a portion housing the offset pivotal axis in concentric relationship to the anti-roll device.

Alternatively, the leaf spring may be mounted to a transverse anti-roll device to which the body chassis is mounted, with the offset pivotal axis being in non-concentric relationship to the anti-roll, device, in which case, the leaf spring could be mounted to the anti-roll device by means of a first bracket, with the mounting of the vehicle body or chassis to the anti-roll device being by means of a second bracket which has a portion housing the offset pivotal axis in non-concentric relationship to the anti-roll device.

The anti-roll device may be a torsion bar or tube and the radial arm and associated offset pivotal axis can be located at or adjacent either end of the leaf spring or at or adjacent both ends of the leaf spring.

In another embodiment, the leaf spring is auxiliary to a main leaf spring which mounts a wheel axle of the vehicle. Also, the invention provides a vehicle incorporating a suspension system according to the one aspect of the invention defined above or any modifications thereof.

Throughout this specification, the following terms, which are well known and used extensively throughout the vehicle suspension industry, are used and defined as follows:

"regular working plane"—that plane, sometimes referred to as the "bending plane", in which a spring leaf in deflected (bent) under normal operating conditions, namely, one which is generally vertical and extends in the fore-and-aft direction of the vehicle;

"normal to the regular working plane"—a perpendicular to the regular working or bending plane of the spring leaf, "neutral axis"—to all intents and purposes, a basic spring leaf is considered to be a regularly-sectioned beam which deflects under a bending load to create a tension stress in the upper surface of the beam (spring leaf) and a compression stress in the lower surface of the beam (spring leaf), the "neutral axis" being that internal layer of the beam (spring leaf) which extends longitudinally and approximately centrally of the section of the beam (spring leaf), which undergoes zero (neutral) stress and about which the beam (spring leaf) deflects (bends) to absorb the energy caused by such deflection (bending);

"spring rate"—deflection of a spring leaf under a specific change of load at that particular loading, which is usually measured in force per unit length of deflection, for example, a spring leaf having a spring rate of 1000 pounds per inch will deflect under a load change of 1000 pounds by one inch; and "notional displacement"—an imaginary movement (displacement) of a component of a vehicle suspension which does not actually take place due to a restraint or resistance placed upon the component by at least one other component of the suspension but which would otherwise take place in the absence of such a restraint or resistance. For example, and in relation to the offset pivotal axis of the inventive suspension system, "notional displacement" of that axis is a movement (displacement) thereof which would otherwise, but does not, arise from deflections of the spring leaf outside defined spring loading and deflection ranges. In certain circumstances, however, the term "notional displacement" may be used alternatively to embrace a displacement (movement) which is so small as to be considered negligible in the context of the inventive suspension system and, thus, effectively being an imaginary movement (displacement) as defined above.

Preferably, the rigid arm is a radial one having one end connected rigidly to the leaf spring at or adjacent an end thereof and its other end connected pivotally to said axis.

As discussed above, the pivotal axis is preferably in the form of a bush provided either at the rear end or the front end of the leaf spring, or there may be such a bush or other pivotal axis at both ends, thereof. The centre of the or each bush affords an axis substantially offset from the neutral (bending) axis of the leaf spring, whose rest position in relation to the adjacent end of the spring may be selected such that no, or substantially no, actual or notional displacement of the offset axis from its rest position will occur for deflections of the spring within predefined spring loading and deflection ranges. However, for deflections of the spring outside the predefined ranges, any notional displacement of the offset pivotal axis will be taken up by the arrangement or construction of the bush or other means, for example, by providing the bush with internal voids.

Preferably, the positioning of the pivotal axis with respect to the region of the end of the leaf spring to which it is connected by the rigid arm is such that (a) in a relatively lightly loaded state of the suspension system, operational or working forces create a softening effect of the spring and (b) in a relatively heavily loaded state of the suspension system, operational or working forces will create a stiffening effect of the spring, such operational or working forces arising from deflection of the spring outside predefined spring loading and deflection ranges.

Again, the pivotal axis may be in the form of a bush, although other suitable forms of pivotal axis means may be employed.

The arrangement of the or each bush or other pivotal axis in relation to the adjacent end of the spring is such that any substantially longitudinally-directed displacement of the bush or other pivotal axis means, arising from a change in curvature and effective length of the spring, is mostly compensated by an opposite longitudinally-directed displacement of the bush or other pivotal axis means arising from a change of the local spring angle. Thus, for spring deflections within predefined spring loading and deflection ranges the bush or other pivotal axis means will experience no, or substantially no, actual displacement; whereas, for deflections outside these defined ranges, any notional displacement may be taken up by the bush or other pivotal axis means.

Another aspect of the invention resides in a method of varying the rate of a leaf spring in a vehicle suspension system comprising a main vehicle body or chassis suspended from a wheel-bearing axle of the vehicle by the leaf spring, the method including connecting one end of a rigid arm to the leaf spring at or adjacent an end thereof, converting the other end of the rigid arm pivotally, preferably substantially freely, to an axis extending generally normal to the regular working plane of the leaf spring, positioning the axis substantially offset from the neutral axis of the leaf spring and taking up any notional displacement, such as substantially negligible linear displacement, of the axis arising, in operation, from deflections of the leaf spring outside predefined spring loading and deflection ranges.

The invention will better be appreciated from the following description of embodiments thereof given by way of example and with reference to the accompanying drawings in which:

BRIEF DESCRIPTION OF THE DRAWINGS

FIGS. 4A and 4B, 5A and 5B and 6A to 6E show modified arrangements of the invention.

DESCRIPTION OF THE PRIOR ART

Figure 1A:
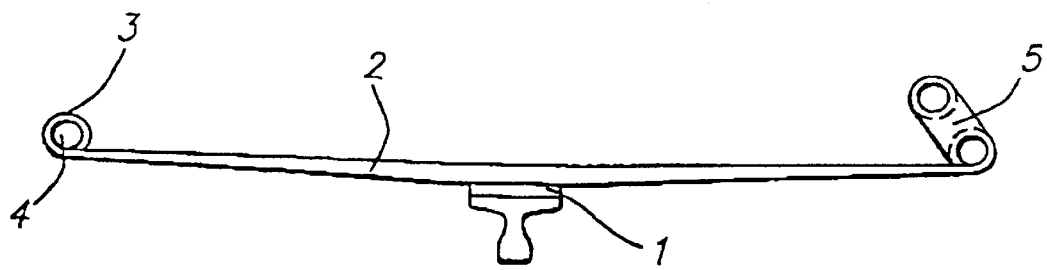
FIGS. 1A, 1B and 1C are illustrative prior art suspension systems not forming part of this invention.

In FIG. 1A of the accompanying drawings, there is shown diagrammatically a vehicle axle 1 from which the vehicle's main body (not shown) is suspended through a leaf spring 2 having, at its front end, in the intended direction of normal travel of the vehicle, a spring eye 3 and bush 4 which affords a substantially longitudinally fixed disposition of the axle 1 relative to the body. At its rear end, a pivotal shackle 5 for accommodating changes of length of the spring 2 as its curvature changes under varying load conditions, is used. In this known arrangement, forces produced by the angle of the shackle 5 can affect the spring defection rate in a non-uniform manner at various loads.

Figure 1B:
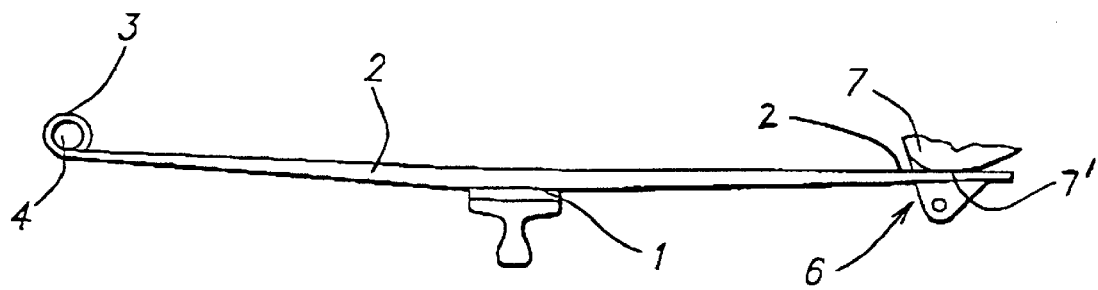
Figure 1C:
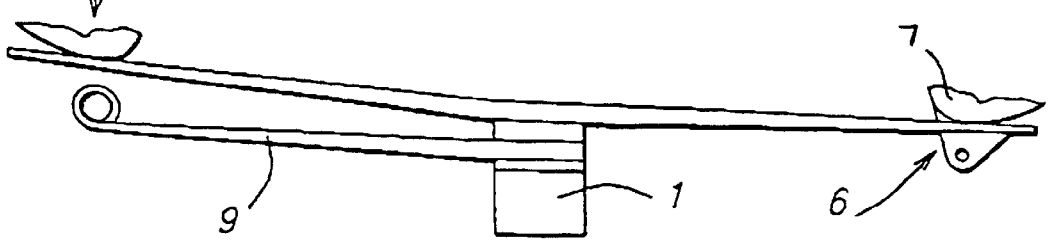

A second prior art suspension system is shown in FIG. 1B, wherein the arrangement is similar to that described above in relation to FIG. 1A but the shackle 5 is replaced by a cam slider bracket 6 in which an upper element 7 has a lower surface 7' of non-uniform curvature bearing upon an upper surface 2' of the spring leaf 2 in frictional contact therewith. As the spring leaf angle changes, in the locality of the cam slider bracket 6, the upper surface 2' of the spring leaf 2 bears upon differing zones of the curved lower surface 7' of the upper element 7 of the bracket 6, which alters the effective length of the spring leaf 2. This also changes the spring leaf deflection rate in a non-uniform manner at various loads and the friction between the curved lower surface 7' of the upper element 7 and the upper surface 2' of the spring leaf 2 has an adverse effect on the quality of the ride experienced on the main body of the vehicle. Further, measures to reduce or eliminate wear of the curved element can made at additional expense in bracket design and manufacture. Even further, the effective length change of the spring leaf 2 can also change the stress distribution along the spring leaf 2, thus deleteriously affecting its fatigue life. The shape of the upper element 7 and the ineffective length of the spring leaf 2 beyond that element 7 use up considerable longitudinal installation space which reduces the effective length of the spring leaf available when the longitudinal installation space is limited, which is normally the situation. A modification, of this known system, as shown in FIG. 1C, includes a cam slider bracket 8 also but at the front end of the spring leaf 2 and a separate radius 9 leaf affording positive longitudinal location for the axle 1.

DETAILED DESCRIPTION OF THE PREFERRED EMBODIMENTS

A preferred embodiment of inventive suspension system comprises a leaf spring 12, as shown in FIGS. 2A and 2B and 3A and 3B, which suspends a vehicle chassis or body (not shown) from a wheel-bearing axle (also not shown) of the vehicle. The front end of the spring 12, as seen in the intended normal direction of travel of the vehicle, is mounted to the chassis or body through a spring eye 13 and bush 14, as is well known, and by such means the position of the axle, in the longitudinal sense of the vehicle, is substantially fixed.

The rear end of the spring 12 has rigidly connected to it one end of a rigid radial arm 15 which has its other end connected to a bush 16 which thus lies substantially offset, in this instance below, from the neutral axis in bending of the leaf spring 12 and whose pivotal axis 20 extends generally normally to the regular working plane of the spring 12. The rearward end of the spring 12 is otherwise unrestrained, that is to say, it is pivotable substantially freely about the axis 20.

Figure 2A:
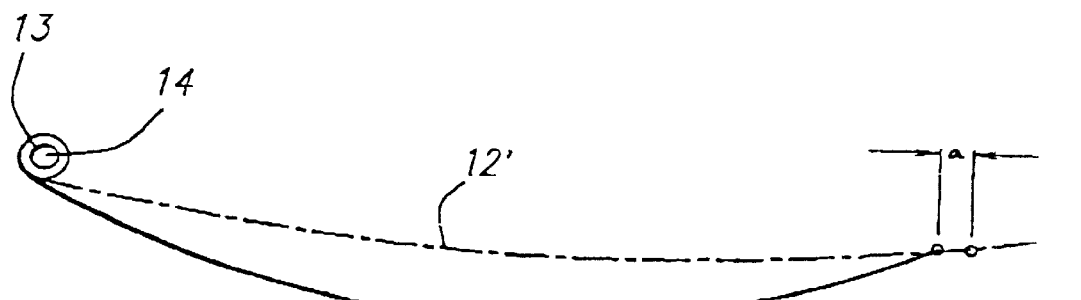
FIGS. 2A and 2B diagrammatically illustrate the principle of the present invention.

The principle of operation of the invention may be appreciated from FIG. 2A, as will now become more evident. As can be seen, in an unladen or only lightly laden condition, the spring 12 has a relatively strong curvature, shown in solid lines in the Figure, whereas under greater loading it assumes a relatively flatter profile 12', shown in chain dotted lines. As the loading increases and the curvature decreases, the relatively unrestrained rearward end of the spring 12, 12' moves rearwardly, i.e. the effective length of the spring changes by an amount indicated by a in the FIG. The spring angle, at this rearward location, also changes. The rearward motion due to the increase in effective length is substantially compensated by a forward motion, indicated by b, of an offset pivotal axis 20 due to the lessening of the spring angle. By appropriate choice of the position of the offset pivotal axis 20, it is possible to provide that, over a limited spring loading and deflection range, the axis 20 will remain effectively stationary as a result of the combined, substantially oppositely-directed motions. With larger deflections of the spring 12 there will be a tendency for the offset pivotal axis 20 to displace slightly, that is to say, by a negligible amount (notional displacement) in a substantially linear manner.

Figure 2B:
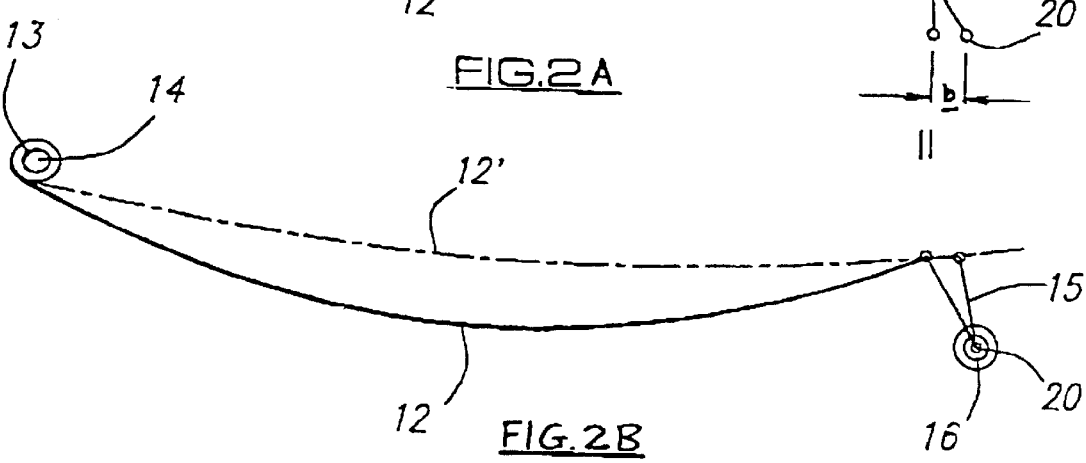

In carrying this principle into practical effect, and as shown in FIG. 2B, a rigid radial arm 15 connects the rearward end of the spring 12 to a bush 16 whose centre point coincides with the required offset axis 20. Means associated with the axis 20 mounts the bush 16 to the vehicle body or chassis. The design and/or resistance of the bush 16 may be such as to take up the error, or notional displacement, in the offset pivotal axis 20 due to larger spring deflections. For example, the bush 20 could have sufficient flexibility of the working range of the spring 12, or could have voids formed therein in the horizontal direction to take-up any substantially linear notional displacement.

When the bush 16 resists the aforementioned displacement of the offset pivotal axis 20, the spring 12 will be forced into a modified shape to accommodate the mismatch between the desired and actual positions of the axis 20. The resulting torque applied to the spring 12 has a favourable effect on spring deflection and stress, as will be described in more detail with reference to FIGS. 3A and 3B.

Figure 3A:
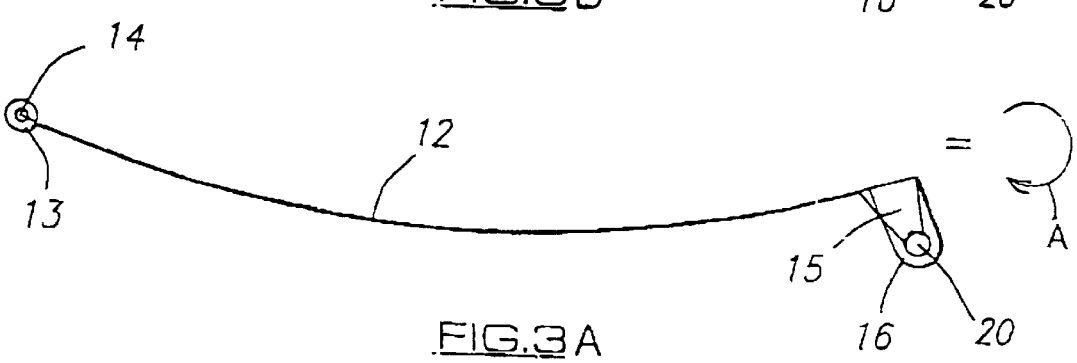
FIGS. 3A and 3B illustrate the performance of the invention under two different load conditions.

FIG. 3A illustrates the situation extant when the suspension is lightly loaded, say when the vehicle is unladen. In this situation, deflection of the spring 12 from the heavily curved "rest" position shown has the effect of producing greater notional displacement of the offset pivotal axis 20 in a substantially linear rearward sense, arising from an increase in the effective length of the spring 12, than the relatively lesser notional displacement in a forward sense, arising from a lessening of the local sprig angle. Any resultant desired generally horizontal displacement of the offset pivotal axis 20 is resisted by the bush 16 giving rise to a mismatch offset force, towards the centre of the spring 12. The torque produced, as shown by arrow A, tends to deflect the spring by a greater amount than a free spring under the given load increase, the effect of this being a softening of the spring which is usually desirable at light load.

Figure 3B:
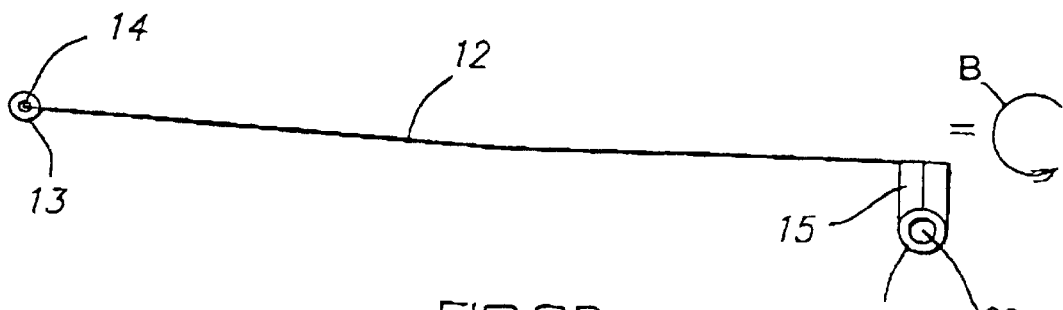

FIG. 3B illustrates the situation extant when the suspension is heavily loaded, say when the vehicle is at or above its design load. By contrast with the FIG. 3A situation, deflection of the spring 12, whose profile is approaching flat in the rest position, has the effect of producing a lesser, substantially linear notional displacement of the offset pivotal axis 20 in a rearward sense, arising from an increase in the effective length of the spring 12, than a relatively greater notional displacement in a forward sense, arising from a lessening of local spring angle. In this case, the torque B produced, as shown by arrow B, resists deflection under an increase in load, the effect of which is to stiffen the spring. Further, when this torque is applied, the stresses within the spring 12 are reduced compared with free spring stresses under the given load. In normal use, this stiffening of the spring 12 and the reduction in stresses are desirable features in a vehicle suspension system when operating at higher loadings.

The invention broadly conceived is not limited to the details of the embodiment described above. For example, it extends to the provision of a bush not only at the rear end of the spring 12, as already described, but in addition or alternative at the front end of the spring 12. Such a front end bush would also be positioned substantially offset from the neutral axis in bending of the spring by a rigid radial arm connected rigidly at one end of the spring, with the pivotal axis 20 of the bush extending generally normally to the regular working plane of the spring.

Furthermore, the present invention may advantageously be incorporated in a suspension system utilising an anti-roll device, for example, an anti-roll torsion bar or tube.

In one such embodiment, as shown in FIGS. 4A and 4B, a vehicle suspension system comprises a pair of leaf springs 22 mounted by means of a suitable bracket 25 to an anti-roll bar 23 which extends transversely of the vehicle chassis 24. The bracket 25 affords a rigid arm 26 extending radially from the anti-roll bar 23, which is thus offset below the neutral axis of the spring, to an end part of the springs 22. Encircling the anti-roll bar 23 at a position, here shown transversely inwardly of the vehicle chassis, is a bush 27 the housing 28 of which is secured to the anti-roll bar 23 or the vehicle chassis 24 to allow rotation of the bar 23 relative to the chassis 24. This bush 27, which is also offset from the neutral axis of the leaf springs 22, thus functions in a manner similar to that described above in the embodiment illustrated with reference to FIGS. 2A and 2B.

This embodiment and any modification thereof is suited for application to the suspension system disclosed in our published International Patent Application No. WO90/11201.

In another embodiment, as shown in FIGS. 5A and 5B, the suspension system is similar to that shown in FIGS. 4A and 4B but in this instance the housing 38 of the bush 37 does not encircle the anti-roll bar 33. Rather, it is secured to the rear of the anti-roll bar 33, to provide a so-called "resistance arm" constituted by the housing 38, which acts between the anti-roll bar 33 and the vehicle chassis or frame 34, during straight axle static bounce of the suspension, to at least partially counteract any consequential rotational movement of the anti-roll bar, thereby applying a couple or moment to, and, as a result altering the deflection and rate of, the suspension.

This embodiment and any modifications thereof is suitable for application to the vehicle suspension disclosed in our published International Patent Application No. WO92/22438.

In both these cases, namely in FIGS. 4A and 4B and FIGS. 5A and 5B, the disposition of the bush 27, 37 transversely offset from the longitudinal axis of the spring 22, 32 allows for more efficient and economical frame brackets. This also allows a clearer frame face adjacent the spring-to-frame cross-member mounting, thus allowing for more satisfactory mounting of other parts such as the body tipping hinge bracket in a dump truck. Also, the brackets may be combined into a single bracket assembly. Another advantage of the simplified spring-to-frame mounting is the creation of the effect of a longer spring in circumstances where constraints exist that prevent the employment of longer springs in conventional systems. This effect, combined with the features described in the aforementioned published International Application No. WO92/22438 concerned with spring rate change, produces an effective variable rate suspension system. This particular system would use a low cost, high durability, mono rate spring and this would obviate the complications involved in the use of a dual or variable rate springs used in practice with typical suspension systems.

Further, in the embodiments described with reference to FIGS. 4A and 4B and FIGS. 5A and 5B, when the spring 22, 32 deflects beyond its flat profile and takes a negatively cured profile, which normally happens at higher loadings and towards bump conditions, the mismatch at the bush 27, 37 becomes high. This is because substantially linear notional displacements at the offset point due to the increase in effective length and local spring angle change are now additive instead of opposed. Therefore, loading on the bush 27, 37 and spring stiffening are high.

The high torque effect on the spring creates a high stiffening therefor and an associated reduction in stress in the spring 22, 32. These are normally desirable features of a suspension system, allowing the use of a softer, cheaper and higher stressed spring under normal working loadings.

Yet further, the present invention may advantageously be incorporated in a suspension system utilising an auxiliary spring as described also in our published International Patent Application No. WO 90/11201.

Figure 6C:
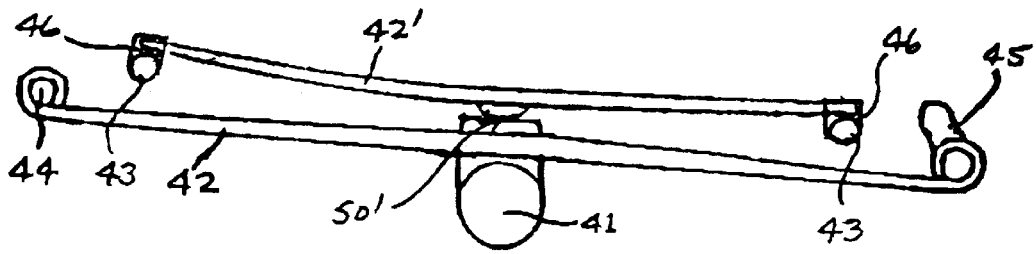
Figure 6D:
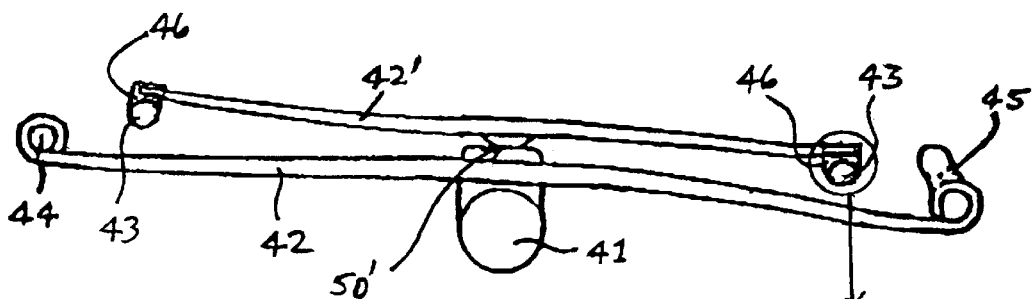
Figure 6E:
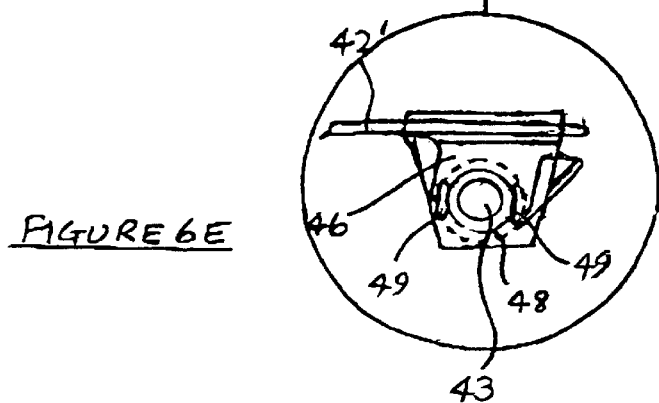

In the embodiment of FIGS. 6A to 6E, as shown particularly in FIG. 6A, the vehicle axle 41 mounts a main leaf spring 42 having the usual frame or chassis-mounting spring eye and bush, and shackle mountings 44, 45, and an auxiliary leaf spring 42' is mounted to the frame or chassis by both front and rear bushes 47 which, in accordance with the present invention, are offset below the neutral axis of the auxiliary spring 42'. Preferably, the bushes 48 in this embodiment are constructed with horizontal voids 49, as shown in FIG. 6E. A transverse anti-roll bar 43 could also be incorporated, if desired, in a manner similar to that illustrated in FIG. 4A and 4B or FIGS. 5A and 5B above. For example, and as shown in the lower part of the FIG. 6B, the anti-roll bars 43 extend transversely between front and rear ends of the auxiliary leaf springs 42' at respective longitudinal sides of the vehicle.

In FIG. 6A, the auxiliary spring 42' and main spring 42 are shown in their unladen or lightly loaded condition of the vehicle, being slightly spaced apart at 50. The auxiliary spring 42' comes into operation part way through operation of the main spring 42, usually at the heavier loading end of the vehicle, as shown in FIG. 6C with the main and auxiliary springs 42, 42' in contact at 50', to assist the main spring 42 in supporting heavier loads. Thus, the axle 41 deflects the main spring 42 upwardly, thereby contacting the auxiliary spring 42', at 50', so that both springs 42, 42' now support the heavier load. FIG. 6D shows a similar arrangement, again with the springs 42, 42' in contact with each other at 50', but supporting a heavier load than that illustrated by the main and auxiliary spring configuration in FIG. 6C.

FIG. 6E is an enlarged view of each bush 48 which is similar to that shown in FIGS. 4A and 4B, in that it comprises a bracket 46 affording a rigid arm with the bush 48 offset from the neutral axis of the auxiliary spring 42', to function in a similar manner to that described above with reference to FIGS. 2A and 2B.

Thus, it will be seen that the invention provides a convenient, simple, effective and efficient suspension system which avoids the disadvantages of the prior art shackle and cam slider bracket arrangements, whilst additionally giving increased performance arising from automatic adaptation of the system to, respectively, low and high suspension loadings, through the appropriate softening or stiffening effects on the spring.

Although the preferred embodiments of inventive suspension system described above employ a bush as the pivot means, other suitable pivot means may be used.

I claim:

1. A suspension system for a vehicle, comprising a leaf spring adapted to suspend a main body or chassis of a vehicle from a wheel-bearing axle of a vehicle, an elongate rigid arm having spaced ends, one end thereof being connected rigidly to the leaf spring at or adjacent an end thereof and the other end thereof including a bushing having an insignificant torsional effect and a throughbore defining an axis adapted to connect the rigid arm pivotally to a vehicle, the pivotal axis being located at a position substantially offset from the neutral axis of the leaf spring, extending generally normally to the regular working plane of the leaf spring and being position along the rigid arm at a position where, in operation of the spring, deflections of the spring over defined spring loading and deflection ranges produce rotation about the offset pivotal access without significant linear displacement of the offset pivotal axis, whereby a bending moment in one direction is created at the point of connection between the rigid arm and leaf spring which causes the spring to deflect upwardly to soften the effect of the leaf spring in a lightly loaded state of the suspension system, and a bending moment in an opposite direction to said one direction is created at the point of connection between the rigid arm and leaf spring which causes the spring to deflect downwardly to stiffen the effect of the leaf spring in a heavily loaded state of the suspension system.

2. A suspension system according to claim 1, wherein the bushing is flexible for controlling any horizontal movement of the offset pivotal axis.

3. A suspension system according to claim 2, wherein the bushing includes internal voids formed therein in the horizontal direction.

4. A suspension system according to claim 1, including an anti-roll device mounted transversely to the leaf spring and adapted to be mounted to a vehicle body or chassis, the offset pivotal axis being in concentric relationship to the anti-roll device.

5. A suspension system according to claim 4, wherein the leaf spring is mounted to the anti-roll device by a first bracket and a second bracket is adapted to mount the anti-roll device to a vehicle body or chassis, the second bracket having a portion housing the offset pivotal axis in concentric relationship to the anti-roll device.

6. A suspension system according to claim 1, including an anti-roll device mounted transversely to the leaf spring and adapted to be mounted to a vehicle body or chassis, the offset pivotal axis being in non-concentric relationship to the anti-roll device.

7. A suspension system according to claim 6, wherein the leaf spring is mounted to the anti-roll device by a first bracket and a second bracket is adapted to mount the anti-roll device to a vehicle body or chassis, the second bracket having a portion housing the offset pivot axis in non-concentric relationship to the anti-roll device.

8. A suspension system according to claim 4, wherein the anti-roll device is one of a torsion bar and a tube.

9. A suspension system according to claim 6, wherein the anti-roll device is one of a torsion bar and a tube.

10. A suspension system according to claim 1, wherein the rigid arm and associated offset pivotal axis are located at an end of the leaf spring.

11. A suspension system according to claim 1, wherein the rigid arm and associated offset pivotal axis are located adjacent an end of the leaf spring.

12. A suspension system according to claim 1, wherein the rigid arm and associated offset pivotal axis are located at both ends of the leaf spring.

13. A suspension system according to claim 1, wherein the rigid arm and associated offset pivotal axis are located adjacent both ends of the leaf spring.

14. A suspension system according to claim 1, wherein the leaf spring is adapted to be auxiliary to a main leaf spring which mounts a wheel-bearing axle of a vehicle.

15. A method of varying the rate of a leaf spring in a vehicle suspension system comprising a main vehicle body or chassis suspended from a wheel-bearing axle of the vehicle by the leaf spring, the method comprising the steps of:
connecting one end of an elongate rigid arm to the leaf spring at an end thereof;
pivotally connecting the other end of the elongate rigid arm to the vehicle body or chassis about an axis located at a position substantially offset from the neutral axis of the leaf spring and extending generally normally to the working plane of the leaf spring; and
positioning the offset pivotal axis along the rigid arm at a position where, in operation of the leaf spring, deflections of the spring over defined spring loading and deflection ranges produce rotation about the offset pivotal axis without significant linear displacement of the offset pivotal axis, whereby
a bending moment in one direction is created at the point of connection between the rigid arm and leaf spring which causes the spring to deflect upwardly to soften the effect of the leaf spring in a lightly loaded state of the suspension system, and a bending moment in an opposite direction to said one direction is created at the point of connection between the rigid arm and leaf spring which causes the spring to deflect downwardly to stiffen the effect of the leaf spring in a heavily loaded state of the suspension system.

16. A method of varying the rate of a leaf spring in a vehicle suspension system comprising a main vehicle body or chassis suspended from a wheel-bearing axle of the vehicle by the leaf spring, the method comprising the steps of:
connecting one end of an elongate rigid arm to the leaf spring adjacent an end thereof;
pivotally connecting the other end of the elongate rigid arm to the vehicle body or chassis about an axis located at a position substantially offset from the neutral axis of the leaf spring and extending generally normally to the working plane of the leaf spring; and
positioning the offset pivotal axis along the rigid arm at a position where, in operation of the leaf spring, deflections of the spring over defined spring loading and deflection ranges produce rotation about the offset pivotal axis without significant linear displacement of the offset pivotal axis, whereby
a bending moment in one direction is created at the point of connection between the rigid arm and leaf spring which causes the spring to deflect upwardly to soften the effect of the leaf spring in a lightly loaded state of the suspension system, and a bending moment in an opposite direction to said one direction is created at the point of connection between the rigid arm and leaf spring which causes the spring to deflect downwardly to stiffen the effect of the leaf spring in a heavily loaded state of the suspension system.

17. A suspension system for a vehicle comprising a leaf spring adapted to suspend a main body or chassis of a vehicle from a wheel-bearing axis of a vehicle, a rigid member connected rigidly to the leaf spring at an end thereof and an axis to which the member is pivotally connected and which is positioned substantially offset from the neutral axis of the spring and extends generally normally to the regular working plane of the leaf spring, wherein the rigid member is a radial arm having one end connected rigidly to the leaf spring at an end thereof and its other end connected pivotally to the offset pivotal axis, wherein the position of the offset pivotal axis with respect to the leaf spring has been defined such that, in operation, deflections of the leaf spring over defined spring loading and deflection ranges produce no, or substantially no actual or notional, displacement of the offset pivotal axis and the offset pivotal axis is disposed with respect to the leaf spring and connected thereof such that:
(a) in a relatively lightly loaded state of the suspension system, operational forces create a softening effect of the spring; and
(b) in a relatively heavily loaded state of the suspension system, operation forces create a stiffening effect of the spring, which forces arise from deflections of the spring outside the defined spring loading and deflection ranges and wherein the offset pivotal axis is adapted to take-up any notional displacement thereof arising, in operation, from deflections of the leaf spring outside the defined spring loading and deflection ranges.

18. A suspension system for a vehicle comprising a leaf spring adapted to suspend a main body or chassis of a vehicle from a wheel-bearing axis of a vehicle, a rigid member connected rigidly to the leaf spring adjacent an end thereof and an axis to which the member is pivotally connected and which is positioned substantially offset from the neutral axis of the spring and extends generally normally to the regular working plane of the leaf spring, wherein the rigid member is a radial arm having one end connected rigidly to the leaf spring adjacent an end thereof and its other end connected pivotally to the offset pivotal axis, wherein the position of the offset pivotal axis with respect to the leaf spring has been defined such that, in operation, deflections of the leaf spring over defined spring loading and deflection ranges produce no, or substantially no actual or notional, displacement of the offset pivotal axis and the offset pivotal axis is disposed with respect to the leaf spring and connected thereto such that:

(a) in a relatively lightly loaded state of the suspension system, operation forces create a softening effect of the spring; and (b) in a relatively heavily loaded state of the suspension system, operation forces create a stiffening effect of the spring, which forces arise from deflections of the spring outside the defined spring loading and deflection ranges and wherein the offset pivotal axis is adapted to take-up any notional displacement thereof arising, in operation, from deflections of the leaf spring outside the defined spring loading and deflection ranges.

19. A suspension system according to claim 17, wherein the offset pivotal axis is of sufficient flexibility to permit it to accommodate said take-up.

20. A suspension system according to claim 18, wherein the offset pivotal axis is of sufficient flexibility to permit it to accommodate said take-up.

21. A suspension system accordingly to claim 17, wherein the offset pivotal axis comprises a bush.

22. A suspension system according to claim 18, wherein the offset pivotal axis comprises a bush.

23. A suspension system according to claim 21, wherein the bush has internal voids for accommodating said take-up.

24. A suspension system according to claim 22, wherein the bush has internal voids for accommodating said take-up.

25. A suspension system according to claim 17, wherein the leaf spring is mounted to a transverse anti-roll device adapted to be mounted to a vehicle body or chassis, with the offset pivotal axis being in concentric relationship to the anti-roll device.

26. A suspension system according to claim 18, wherein the leaf spring is mounted to a transverse anti-roll device adapted to be mounted to a vehicle body or chassis, with the offset pivotal axis being in concentric relationship to the anti-roll device.

27. A suspension system according to claim 25, wherein the leaf spring is mounted to the transverse anti-roll device by means of a first bracket and a second bracket is adapted to mount the anti-roll device to a vehicle body or chassis, the second bracket having a portion housing the offset pivotal axis in concentric relationship to the anti-roll device.

28. A suspension system according to claim 26, wherein the leaf spring is mounted to the transverse anti-roll device by means of a first bracket and a second bracket is adapted to mount the anti-roll device to a vehicle body or chassis, the second bracket having a portion housing the offset pivotal axis in concentric relationship to the anti-roll device.

29. A suspension system according to claim 27, wherein the first and second brackets are combined into a single bracket assembly.

30. A suspension system according to claim 28, wherein the first and second brackets are combined into a single bracket assembly.

31. A suspension system according to claim 19, wherein the leaf spring is mounted to a transverse anti-roll device adapted to be mounted to a vehicle body chassis, with the offset pivotal axis being in non-concentric relationship to the anti-roll device.

32. A suspension system according to claim 18, wherein the leaf spring is mounted to a transverse anti-roll device adapted to be mounted to a vehicle body chassis, with the offset pivotal axis being in non-concentric relationship to the anti-roll device.

33. A suspension system according to claim 31, wherein the leaf spring is mounted to the transverse anti-roll device by means of a first bracket and a second bracket is adapted to mount the anti-roll device to a vehicle body or chassis, the second bracket having a portion housing the offset pivotal axis in non-concentric relationship to the anti-roll device.

34. A suspension system according to claim 32, wherein the leaf spring is mounted to the transverse anti-roll device by means of a first bracket and a second bracket is adapted to mount the anti-roll device to a vehicle body or chassis, the second bracket having a portion housing the offset pivotal axis in non-concentric relationship to the anti-roll device.

35. A suspension system according to claim 25, wherein the anti-roll device is a torsion bar or tube.

36. A suspension system according to claim 26, wherein the anti-roll device is a torsion bar or tube.

37. A suspension system according to claim 17, including a rigid member and associated offset pivotal axis located at either end of the leaf spring.

38. A suspension system according to claim 18, including a rigid member and associated offset pivotal axis located at either end of the leaf spring.

39. A suspension system according to claim 17, including a rigid member and associated offset pivotal axis located adjacent either end of the leaf spring.

40. A suspension system according to claim 18, including a rigid member and associated offset pivotal axis located adjacent either end of the leaf spring.

41. A suspension system according to claim 17, including a rigid member and associated offset pivotal axis located at both ends of the leaf spring.

42. A suspension system according to claim 18, including a rigid member and associated offset pivotal axis located at both ends of the leaf spring.

43. A suspension system according to claim 17, including a rigid member and associated offset pivotal axis located adjacent both ends of the leaf spring.

44. A suspension system according to claim 18, including a rigid member and associated offset pivotal axis located adjacent both ends of the leaf spring.

45. A suspension system according to claim 17, wherein the leaf spring is adapted to be auxiliary to a main leaf spring mounting to a wheel-bearing axle of a vehicle.

46. A suspension system according to claim 18, wherein the leaf spring is adapted to be auxiliary to a main leaf spring mounting to a wheel-bearing axle of a vehicle.

* * * * *